United States Patent [19]

Fredriksson

[11] 4,308,419

[45] Dec. 29, 1981

[54] ELECTRICALLY INSULATING BALL BEARING SWIVEL

[75] Inventor: Lars O. A. Fredriksson, Växjö, Sweden

[73] Assignee: K A Bergs Smide AB, Gemla, Sweden

[21] Appl. No.: 22,711

[22] Filed: Mar. 22, 1979

[30] Foreign Application Priority Data

Apr. 11, 1978 [SE] Sweden .................................. 7804016

[51] Int. Cl.³ .................... F16G 15/08; H01B 17/00
[52] U.S. Cl. ................................. 174/185; 59/95; 403/78; 403/165
[58] Field of Search ............. 174/85, 138 D, 180, 174/181, 182, 183, 184, 185, 207, 161 R; 59/95; 105/156; 198/682; 285/52; 294/82 R; 248/317, 339, 341; 403/78, 164, 165

[56] References Cited

U.S. PATENT DOCUMENTS

| 468,053 | 2/1892 | Englund | 59/95 X |
|---|---|---|---|
| 497,251 | 5/1893 | Peeples | 285/52 |
| 2,384,490 | 9/1945 | Plum et al. | 403/31 |
| 2,740,000 | 3/1956 | Wierk | 59/95 X |
| 2,897,257 | 7/1959 | Ingram et al. | 174/183 |
| 3,764,169 | 10/1973 | St. Clair | 285/52 |

FOREIGN PATENT DOCUMENTS

| 484790 | 8/1917 | France | 174/161 R |
|---|---|---|---|
| 60696 | 4/1926 | Sweden | 294/82 R |
| 357836 | 10/1931 | United Kingdom | 59/95 |

*Primary Examiner*—Laramie E. Askin
*Attorney, Agent, or Firm*—Fulwider, Patton, Rieber, Lee & Utecht

[57] ABSTRACT

A ball bearing swivel comprises a substantially bowl-shaped casing member having first connection means in its closed end, and a stud member having second connection means in that one of its ends which faces away from the casing member. The stud member is journalled in the bowl-shaped housing member by means of a ball or roller bearing. For eliminating the risk of accidents through one of the wires or the like to which the swivel is connected, if the other wire or the like which is connected to the swivel should get into contact with an electrical overhead line or another possibly high-tensioned object, the ball bearing swivel also comprises an electrically insulating insert by means of which the bowl-shaped casing member of the ball bearing swivel is electrically insulated from the stud member.

11 Claims, 20 Drawing Figures

ELECTRICALLY INSULATING BALL BEARING SWIVEL

BACKGROUND OF THE INVENTION

This invention relates to a ball bearing swivel of the type which comprises a substantially bowl-shaped casing member having connection means in its closed end, and a stud member which has second connection means in that one of its ends which faces away from said casing member and in its other end a shank member which by means of a ball or roller bearing is journalled substantially undisplaceably in the direction of the rotational axis of the swivel in the bowl-shaped housing member. Such swivels are utilized to make possible mutual rotation between two interconnected members, e.g. a crane hook with a load suspended therein and a chain or wire, in which the hook is suspended. Swivels of this general kind which may be either of the ball bearing type or the slide bearing type have long been known. An example of such a ball bearing swivel forms the subject matter of the U.S. Pat. No. 2,384,490.

It is also known (U.S. Pat. No. 2,897,257) to insulate a crane hook from the wire, chain or the like in which the hook is suspended through an insulating link or connection member which is interposed between the hook and the wire. The object of the insulating link is primarily to prevent a person who with or without purpose contacts the hook or an electrically conducting object suspended therein from being subjected to a dangerous electrical shock if the electrically conducting wire or the like, in which the hook is suspended, should get into contact with a high-voltage electrical overhead line. Other devices of a related kind are disclosed in the U.S. Pat. Nos. 2,740,000 and 3,764,169.

SUMMARY OF THE INVENTION

The principal object of the invention is to provide on the basis of the prior state of art an electrically insulating, versatile ball bearing swivel having two mutually easily rotatable parts.

This object is attained by the stud member of the swivel according to the invention being electrically insulated from said casing member.

In addition to the elimination of the danger of shocks for persons handling objects suspended in a hook whose chain or wire has become current conducting, the novel swivel becomes particularly suitable in connection with arc-welding of objects which are suspended in a hook by electrically conducting means, since the swivel according to the invention prevents the formation of vagabonding currents through hook, wire, telfer, and so on because of this feature. Thus, the welding current is forced to flow the right way by the swivel which whereby eliminates the danger of the weakening of the crane wire or chain by undesired tempering or other heat treatment. The swivel in accordance with the invention may also to advantage be utilized in chemical industries, where electrolytic processes occur, particularly in the aluminum industry where it is often necessary to carry out hoisting operations in galvanic baths.

In a preferred embodiment of the invention there is inserted in the force transmission area between the stud member and the casing member, which at its outer, open end is provided with an internal, annular support ring, an insulating bushing which substantially covers the inner (axially as well as radially) surfaces of the support ring, between the latter and a ball bearing ring having a first race-way for the balls or rollers which substantially faces the bottom or inner end of the bowl-shaped casing member, a second race-way being provided on the stud member, substantially diametrically opposite the first race-way with respect to the balls or rollers.

BRIEF DESCRIPTION OF THE DRAWINGS

Further features and advantages of the ball bearing swivel according to the invention will become apparent from the following detailed description and the annexed drawings, which diagrammatically and as non-limiting examples illustrate some embodiments of the invention.

In all Figures one and the same reference numeral always designates the same or like details.

DESCRIPTION OF THE PREFERRED EMBODIMENTS

Figure 1:
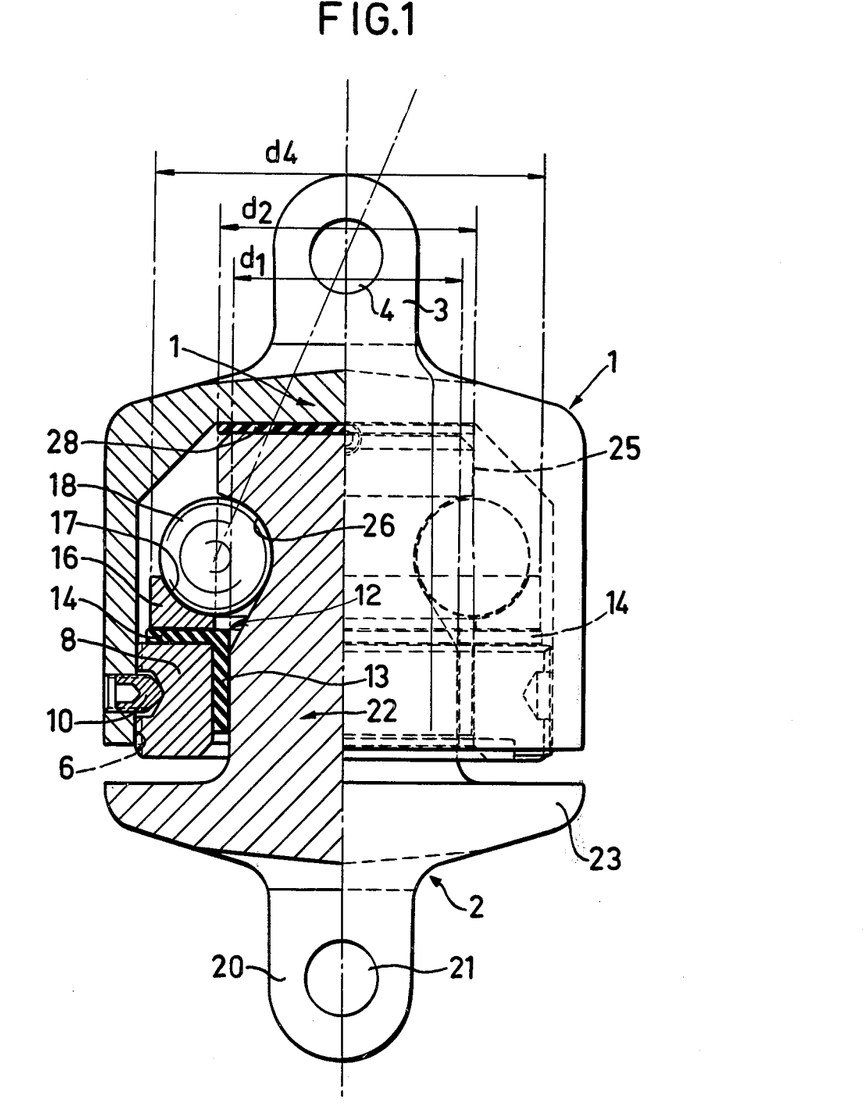
FIG. 1 illustrates a ball bearing swivel of the angle contact type according to the invention, partly in axial longitudinal section and partly in plan view.
Figure 2:
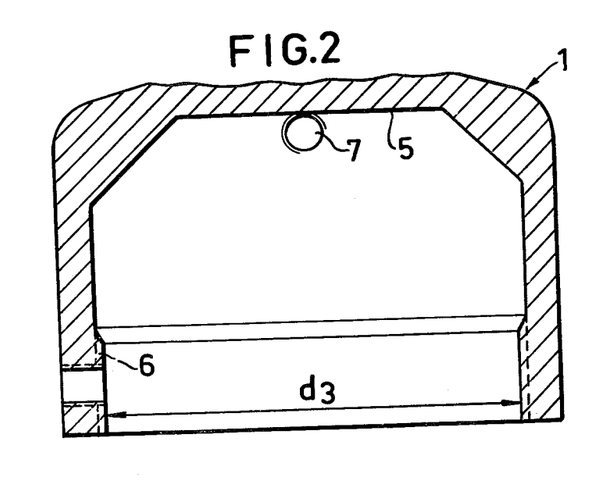
FIG. 2 illustrates the casing member of the swivel according to FIG. 1 in a partial axial longitudinal sectional view.
Figure 3:
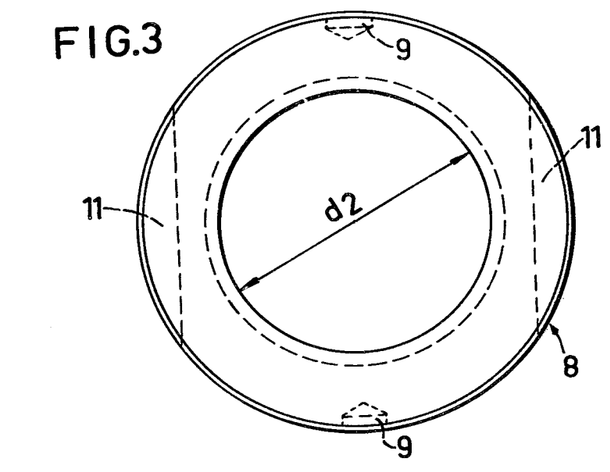
FIG. 3 is a plan view of the support ring of the swivel according to FIG. 1.
Figure 4:
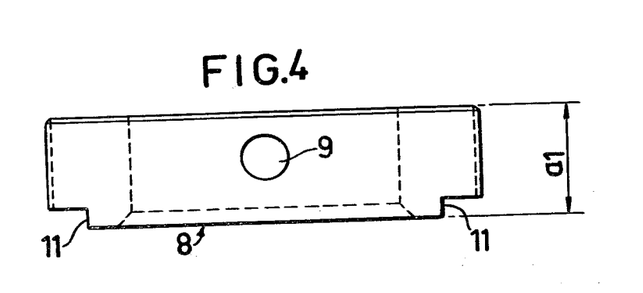
FIG. 4 is a side view corresponding to FIG. 3.
Figure 5:
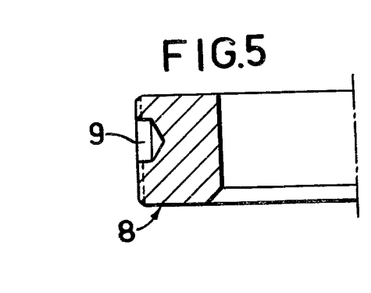
FIG. 5 is a half axial longitudinal sectional view corresponding to FIGS. 3 and 4.
Figure 10:
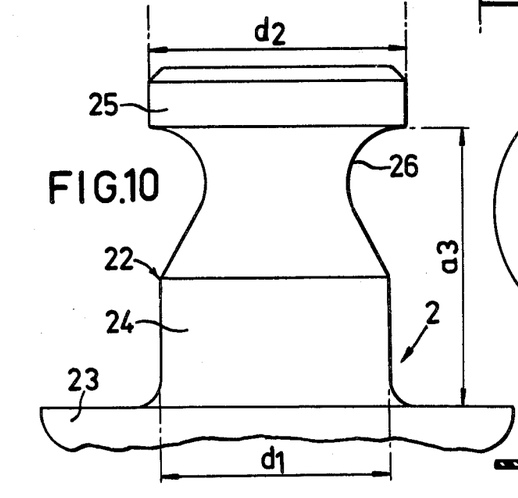
FIG. 10 illustrates the stud member of the swivel according to FIG. 1 in a partial side view.
Figure 11:
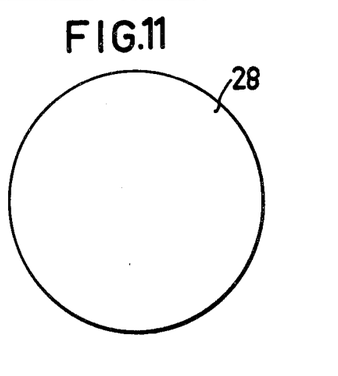
FIG. 11 is a plan view of the insulating bottom liner or insert of the swivel according to FIG. 1.
Figure 12:
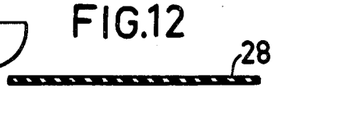
FIG. 12 is an axial sectional view through the insulating liner according to FIG. 11.
Figure 13:
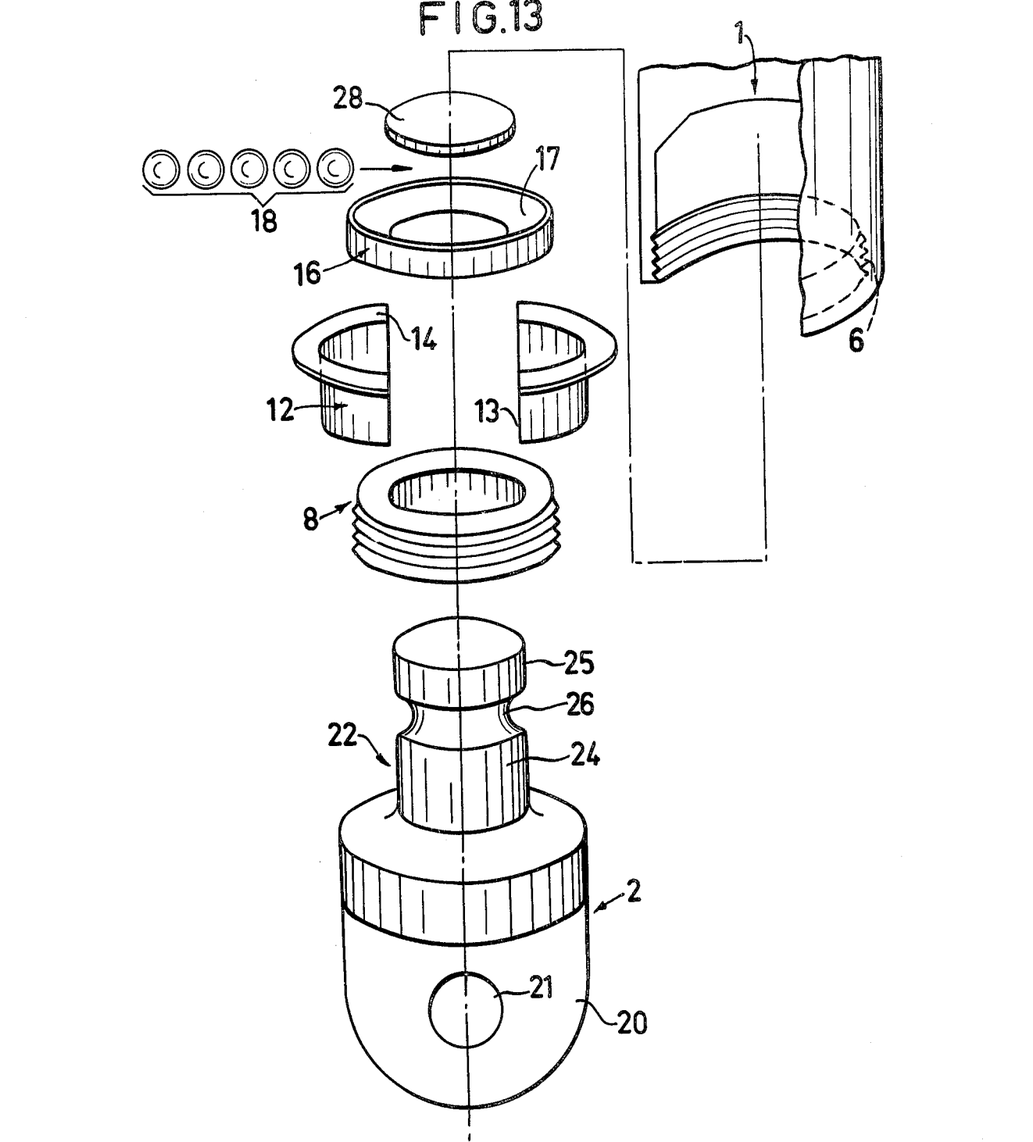
FIG. 13 is an exploded perspective view of the ball bearing swivel according to FIG. 1.

The principal parts of the ball bearing swivel according to the invention are a substantially bowl-shaped casing member 1 (FIGS. 1, 2 and 13) and a stud member 2 (FIGS. 1, 10 and 13).

The casing member has a connection means which in the disclosed embodiment is comprised of one, two or more ears 3 having coaxial openings 4 for a pin (not shown) by means of which the casing member 1 can be connected to a chain link, a hook or the like. Internally the casing has a substantiallly planar bottom 5 (FIG. 2), and at its open end it is provided with an internal thread 6 having an inside diameter which is designated width $d_3$. 7 designates an opening for the supply of a possibly insulating lubricant.

Figure 6:
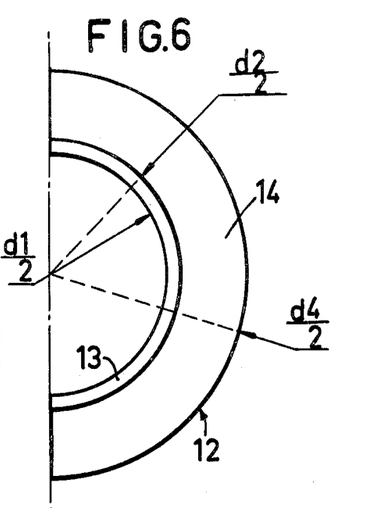
FIG. 6 is a half plan view of the bushing of the swivel according to FIG. 1.
Figure 7:
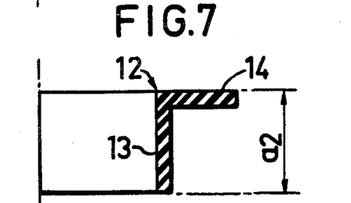
FIG. 7 is a half axial sectional view corresponding to FIG. 6 of the bushing.
Figure 8:
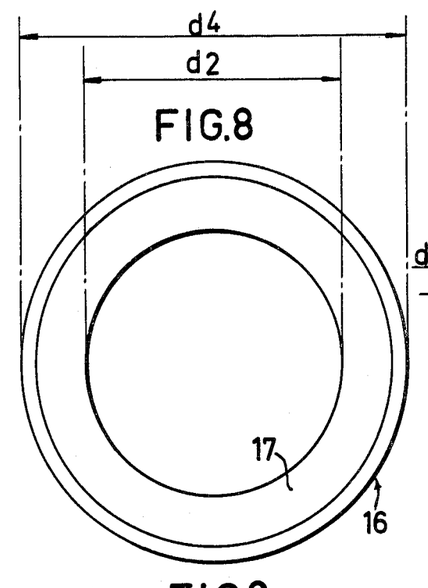
FIG. 8 is a plan view of the ball bearing ring of the swivel according to FIG. 1.
Figure 9:
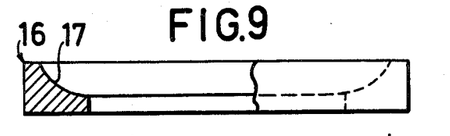
FIG. 9 is a half side view and a half axial sectional view illustrating the ball bearing ring according to FIG. 8.

A support ring 8 (FIGS. 1, 3, 4, 5, 13) which is provided with an external thread cooperating with the thread 6 and which also has a planar inner end surface, an inside diameter $d_2$, an outside diameter which is a little smaller than $d_3$, and a height $a_1$ (in the direction of the rotational axis of the ball bearing swivel) also belongs to the casing member. The support ring 8 is provided with a least one recess 9 (two recesses in the embodiment) for a stop screw 10 (FIG. 1) by means of which the support ring 8 can be fixed in the rotational direction after having been screwed into the casing member 1. To facilitate the turning of the support ring it is provided with two diametrical flattened portions 11. The axially as well as radially inner surfaces of the support ring are (in the mounted condition of the ball bearing swivel) covered by an insulating bushing (FIGS. 1, 6, 7, 13) which is generally designated with 12 and suitably is of plastic or ceramics. In the embodiment according to FIG. 1 the bushing 12 is comprised of two identical halves which are located on each side of a diametrical plane and of which one is illustrated in FIGS. 6 and 7. The composite bushing consists of a circular-cylindrical or tubular portion 13 which is coaxial with the rotational axis of the ball bearing swivel (in its mounted condition) and a radially outwardly directed flange 14 which is provided at the inner end of the tubular portion. As is indicated in FIGS. 6 and 7 the tubular portion 13 has an inside diameter of (slightly more than) $d_1$ and an outside diameter of (slightly less than) $d_2$ and a height of $a_2$ in its axial direction. The outside diameter of the flange 14 is $d_4$.

Immediately inside the axially inner end of the flange 14 of the insulating bushing 12 there is provided a ball bearing ring 16 (FIGS. 1, 8, 9, 13) which is coaxial with the casing member 1, the stud member 2, the support ring 8 and the bushing 12 and which has a concave race-way 17 for the balls 18 of the ball bearing swivel which faces the connection means 3, 4 of the casing member 1 and which approximately has the inside diameter $d_2$ and the outside diameter $d_4$. The outside diameter can suitably be somewhat less than $d_4$ to ensure that the distance between those surfaces of the ball bearing ring which face outwards and those faces of the casing which face inwards becomes sufficiently large to prevent electrical contact or flashover.

It is important that the bushing 12 does not rotate on the axis of the ball bearing swivel. On account hereof those surfaces of the tubular member 13 and/or the flange 14 which face the support ring 8 may be provided with serrations (not shown) or the like which cooperate with and engage corresponding serrations (not shown) or equivalent means on those surfaces of the ring 8 which face the bushing 12. Supplementary or alternatively those surfaces of the flange 14 and the ball bearing ring 16 which face each other may be provided with cooperating and interengaging serrations or the like (not shown).

The other principal part of the ball bearing swivel, the stud member 2 (FIGS. 1, 10, 13) comprises connections means which like those of the casing are comprised of two or more ears 20 having mutually coaxial apertures 21 for a stud or shaft, a shank portion which is generally designated with 22 and projects into the casing member 1, and a flange 23 (not shown in FIG. 13) which is located intermediate the connection means 20, 21 and the shank portion 22 and which fits the opening of the casing member 1. The shank portion 22 comprises an outer, substantially circular-cylindrical portion 24 which is located nearest the flange 23, said outer portion having the diameter $d_1$ (FIG. 10), an inner (in respect to the casing member 1), substantially circular-cylindrical portion 25, which has the diameter $d_2$, and a race-way 26 which has a concave profile and is located between the cylindrical portions 24, 25. The total axial height of the race-way 26 and the outer cylindrical portion 24 is $a_3$.

Between the inner end surface of the cylindrical portion 25 of the shank 22 and the bottom of the casing member 1 there is provided an electrically insulating insert 28 (FIGS. 1, 11, 12, 13), which preferably is circular and has a diameter which equals or is somewhat less than $d_2$ to ensure that the parts 1 and 2 do not contact each other.

At the mounting of the swivel, all parts of which described above with the exception of the insulated bushing 12 and the insert 28 are of metallic, electrically conducting material, preferably alloyed steel, the support ring 8 is first threaded over the shank 22 of the stud member until the ring rest upon the flange 23 of the stud member. After that the two halves of the insulating bushing 12 are united into a whole ring just opposite the race-way 26 of the shank 22, which is made possible because the dimension $a_3$ (FIG. 10) is greater than the sum of the dimensions $a_1$ (FIG. 4) and $a_2$ (FIG. 7), and after that the annular bushing 12 is displaced downwards in FIG. 1, so that the tubular portion 13 of the bushing becomes located between the shank 22 and the support ring 8 and completely fills the radial interspace between them. Then, the ball bearing ring 16 is disposed above the flange 14 of the bushing 12 which is made possible due to the fact that the inside diameter of the ring 16 is a fraction larger than the diameter $d_2$ of the inner shank portion 25. After that the balls 18 which are seven in number in the illustrated embodiment are inserted into the opening between the race-ways 17 and 26 of the ball bearing ring 16 and the shank 22, respectively. After that the insert 28 is applied onto the cylindrical shank portion 25. The parts mounted according to the above are finally put together with the casing member 1 which is threaded upon them from the "shank end", which is made possible since the inside diameter $d_3$ of the thread of the casing member is a little larger than $d_4$, after which the support ring 8 is screwed by means of a suitable wrench with its thread engaging the corresponding thread 6 of the casing member 1, until the insert 28 is clamped between the end surface of the shank 22 and the bottom of the casing member. For providing an adequate, small clearance the thread of the support ring 8 is rotated e.g. a quarter of a revolution backwards, after which the support ring is fixed by screwing the stop screw 10 into the recess 9 of the support ring. The fixation can also be made in another suitable way.

The race-ways 17, 26 are preferably so located and shaped that a line through the centre of the suspension means of the casing member 1 (the point of impact of the outer force acting upon the casing member 1) and the centre of each ball 18 intersects the two race-ways 17, 26 and the radial flange 14 of the insulated bushing 12.

When studying the force flow from the shank 22 via its concave ball bearing surface 26 through the balls 18 to the spherically concave surface 17 of the ball bearing ring 16 via the lower surface of the ring through the flange portion 14 of the bushing halves via the upper planar surface of the support ring 8 through the threaded connection 6 in the outer surface of the ring onto the casing 1, one will find that the critically dimensioned part is constituted by the bushing halves 12. The material of the bushing halves 12 does not admit so high surface pressures as metallic materials do. On account hereof it is desirable that the effectively load transferring surface from the ball bearing ring 16 axially to the support ring 8 becomes as large as possible. The dimension of this surface is determined by two concentric circles having the diameters $d_4$ and $d_2$, respectively.

The surface is $(d_4^2 - d_2^2)/4 \times \pi$, where $d_4$ relates to the smallest one of the respective outer diameters of the rings 16 and 8 and $d_2$ relates to the largest one of the respective inner diameters of said rings.

Thus, so great a value as possible of $d_4$ and so small a value as possible of $d_2$ is desired to obtain a maximum load capacity at a given external dimension of the casing 1 and the stud 2.

Figure 14:
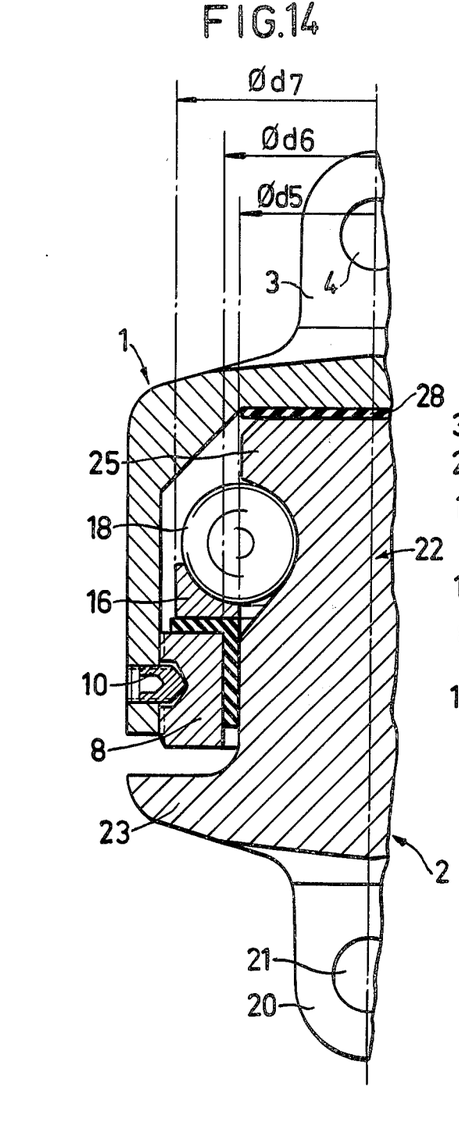
FIG. 14 is an axial partial sectional view corresponding to the left-hand half of FIG. 1 through a modified ball bearing swivel.

In FIG. 14 there is illustrated in a partial, axial, longitudinal sectional view a modified ball bearing swivel in which the insulating bushing 12 is made in one piece instead of being constituted of two parts as in the embodiment described above. To make possible the threading of the bushing over the end 25 of the shank 22, which is the intention in this case, the bushing 12 has an inside diameter $d_5$ which is a little larger than $d_2$. The outside dimension of the cylindrical portion 13 of the insulating bushing is approximately as much larger than $d_5$ as $d_2$ is larger than $d_1$ and substantially equals the inner diameter $d_6$ of the load supporting ring 8. The flange 14 of the bushing according to FIG. 14 has an outside diameter which is a fraction less than $d_3$ to make possible the mounting of the swivel. As in the embodiment according to FIG. 1 the outer diameter of the ball bearing ring is a little smaller than that of the flange 14 and is in this case equal to $d_7$. In this case the effective load transferring surface of this insulating bushing 12 equals $\pi \times (d_7^2 - d_6^2)/4$, which under the above presuppositions is less than that of the embodiment according to FIG. 1. Accordingly, the embodiment according to FIG. 14 yields a smaller load capacity at the same dimensions of the casing 1 and the same compression stress upon the insulating bushing 12.

Figures 15, 16, 17:
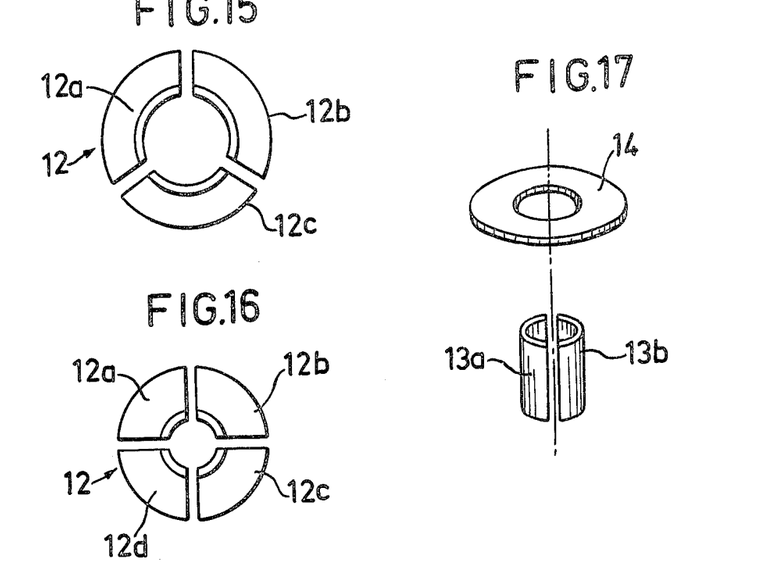
FIGS. 15 and 16 are plan views of two modified embodiments of the insulating bushing.
FIG. 17 is an exploded perspective view of a further modified bushing.

FIGS. 15 and 16 illustrate in plan view two modified embodiments of the insulating bushing 12 which is here divided along radial planes into three and four parts, respectively, viz. 12a, 12b, 12c and 12a, 12b, 12c and 12d, respectively, which form a composite, annular flange after having been joined.

In accordance with a further exemplificatory embodiment the insulated bushing 12 may be divided in such a way that the tubular part 13 and the flange 14 constitute individual parts, as is shown in FIG. 17, which individually may consist of one piece 14 or may be divided into several pieces 13a, 13b on radial planes, as is shown in FIG. 17.

Figure 18:
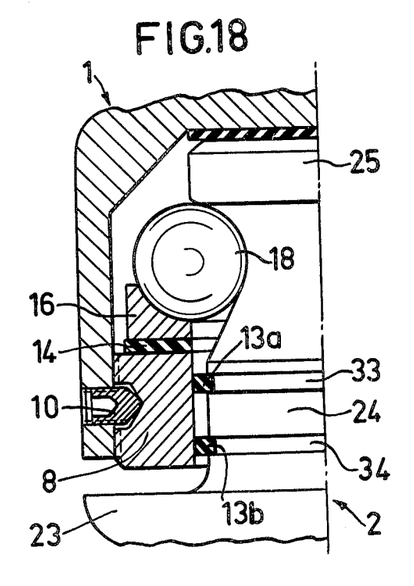
FIG. 18 is an axial partial sectional view through a ball bearing swivel having another modified insulating bushing.
Figure 19:
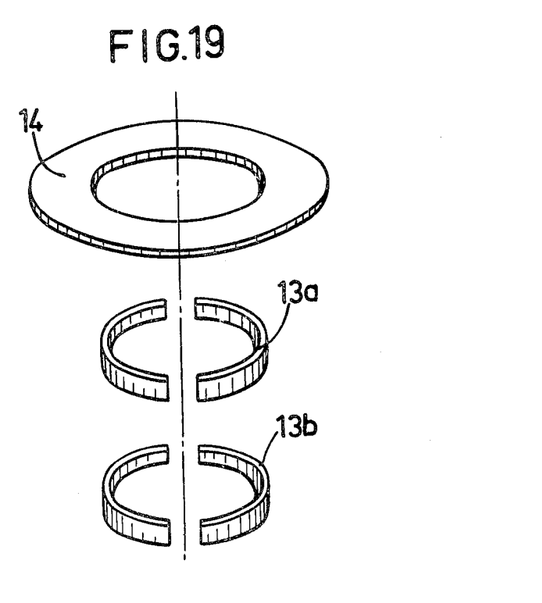
FIG. 19 is an exploded perspective view of the tripartite bushing of the exemplificatory embodiment according to FIG. 18.

As is diagrammatically illustrated in FIGS. 18 and 19, the tubular part 13 may further be divided into two or more parts axially, each of which is fixed in grooves 33 and 34, respectively in the shank portion 24. In this embodiment the radial interspace between the shank portion 24 and the inner surface of the support ring 8 need not be completely filled.

In those embodiments where the flange-shaped portion 14 and the tubular portion 13 of the bushing 12 are separated, the mounting differs somewhat from the mode described above. Thus, the tubular portions 13 and 13a+13b, respectively, are first mounted in position around the envelope surface of the shank portion 24. After that the support ring 8 is axially brought into its place over the shank portion 24. Then, the flange-shaped portion 14 of the bushing 12 is applied to the planar, inner end surface of the support ring 8, after which the ball bearing ring 16 is put into its place. After that the sequence of the mounting operation is as previously described.

Figure 20:
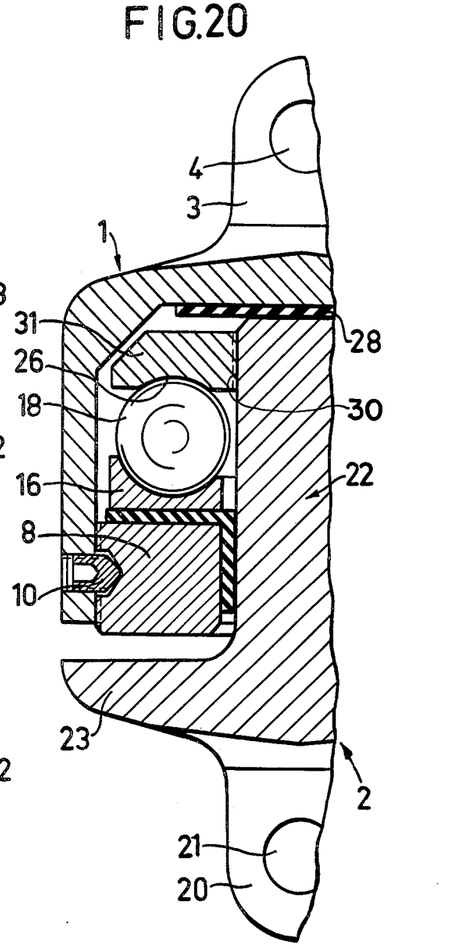
FIG. 20 illustrates, in the same way as FIG. 14, a partial sectional view of another embodiment of the swivel, which here has a pure axial bearing.

In FIG. 20 there is illustrated a further, modified embodiment in which the ball bearing is not of the angular contact type but a plain radial bearing. In FIG. 20 the shank 22 of the stud member is purely circular-cylindrical and is at its inner end, which corresponds to the portion 25 in FIGS. 1 and 10, provided with a thread 30, upon which there is screwed a second, internally threaded ball bearing ring 31.

In all cases the stud member 2, the balls 18 and the ball bearing ring 16 or the ball bearing rings 16 and 31, respectively, are insulated electrically from the support ring 8 and the casing member 1 by the bipartite, composite bushing 12 or the one-piece bushing 12, respectively.

The embodiments described above and illustrated in the drawings are, of course, to be regarded merely as non-limiting examples and may as to their details be modified in several ways within the scope of the following claims. For instance, new embodiments, which are also covered by the inventive concept, may be created by combining details from different ones of the exemplificatory embodiments described above. In addition hereto, rollers may be substituted for the balls 18. Accordingly, the designation "ball bearing" also comprises all bearings having balls or substantially cylindrical, substantially conical or differently shaped roller elements. Balls and rollers are thus jointly referred to as "rolling bodies" in the claims.

What I claim is:
1. A swivel which comprises:
   (a) a substantially bowl-shaped casing member (1) having first connection means (3, 4) in a closed end thereof;
   (b) a stud member (2) having second connection means (20, 21) wherein one of said stud member ends faces away from said casing member (1), said other end of said stud member (2) having a shank (22) which includes an outer body portion (24), an inner head portion (25), and an intermediate throat portion (26) of less diameter than at least said inner head portion (25), said stud member (2) being journalled substantially undisplaceably in the direction of the rotational axis of said swivel in said bowl shaped casing member (1) by means of a ball or roller bearing having rolling members (18) at least partially penetrating into a radial space adjacent and external said throat portion (26), said radial space being at least partially defined by a surface of said throat portion (26) and an adjacent surface of said inner head portion (25);

(c) a support ring (8) releasably secured to an inner section of said casing member (1), said support ring (8) positionally located substantially opposite said body portion (24) of said shank (22), said support ring (8) having an inner diameter less than an envelope circle diameter circumscribing a radially outermost portion of said rolling members (18) when mounted in said throat portion (26), said stud member (2) being retained in an axial position by the engagement of said inner head portion (25) behind said rolling members (18) and said support ring (8);

(d) a ball or roller bearing ring (16) having a race-way (17) directed toward said inner closed end of said casing member (1), said ball or roller bearing ring (16) being positioned between said rolling members (18) and said inner section of said casing member (1); and, (e) a bushing (12) including an insulating ring (14) located between said bearing ring (16) and said support ring (8) for insulating each from the other and a tubular insulating member (13) being located between said outer body portion (24) of said stud member (2) and said support ring (8) for insulating each from the other, whereby said stud member (2) is electrically insulated from said casing member (1).

2. The swivel as recited in claim 1 wherein said body portion (24) of said shank (22) is substantially cylindrically circular in contour having a diameter ($d_1$) substantially equal to an inner diameter of said bushing (12), said head portion (25) of said shank (22) being cylindrically circular in contour, said throat portion (26) of said shank (22) having a substantially rotational symmetry including a concave profile for insert of said rolling members (18).

3. The swivel as recited in claim 2 where an axial extension ($a_3$) of said body portion (24) plus an axial extension of said throat portion (26) of said shank (22) is greater than an axial extension ($a_1 + a_2$) of said support ring (8) and said insulating bushing (12).

4. The swivel as recited in claims 1, 2 or 3 where said bushing (12) is cylindrically circular in contour, said bushing (12) being formed of two similar portions located on opposing sides of a plane containing said rotational axis of said swivel.

5. The swivel as recited in claims 1, 2 or 3 where said bushing (12) comprises at least three portions located on different sides of a plane containing said rotational axis of said swivel.

6. The swivel as recited in claims 1, 2 or 3 where said insulating ring (14) of said bushing (12) and said tubular insulating member (13) of said bushing (12) constitute two separate members.

7. The swivel as recited in claim 6 where said tubular insulating member (13) is composed of at least two insulating member portions.

8. The swivel as recited in claim 7 where said two insulating member portions are separated each from the other along a plane containing said rotational axis of said swivel.

9. The swivel as recited in claim 7 where said tubular insulating member includes a plurality of coaxial rings (13a, 13b) which are disposed with mutualaxial interspaces threbetween.

10. The swivel as recited in claim 1 where said bushing (12) is formed in one-piece formation.

11. The swivel as recited in claim 1 including an insulating insert member (28) positionally located between an inner lower surface of said casing member (1) and an end (25) of said shank member (22) located adjacent said casing member (1).

* * * * *